(12) United States Patent
Spielmann

(10) Patent No.: US 9,463,667 B2
(45) Date of Patent: Oct. 11, 2016

(54) AXLE MOUNT FOR UTILITY VEHICLES

(71) Applicant: SAF-HOLLAND, GmbH, Bessenbach (DE)

(72) Inventor: Rolf Spielmann, Wertheim-Bettingen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 14/237,291

(22) PCT Filed: Sep. 20, 2012

(86) PCT No.: PCT/EP2012/068487
§ 371 (c)(1),
(2) Date: Aug. 5, 2014

(87) PCT Pub. No.: WO2013/041597
PCT Pub. Date: Mar. 28, 2013

(65) Prior Publication Data
US 2015/0061253 A1    Mar. 5, 2015
US 2016/0009133 A9    Jan. 14, 2016

(30) Foreign Application Priority Data

Sep. 22, 2011  (DE) .................. 10 2011 083 221

(51) Int. Cl.
*B60G 9/00*     (2006.01)
*B60B 35/00*    (2006.01)
(Continued)

(52) U.S. Cl.
CPC ............. *B60B 35/004* (2013.01); *B60G 3/145* (2013.01); *B60G 7/001* (2013.01); *B60G 7/008* (2013.01); *B60G 9/00* (2013.01); *B60G 9/003* (2013.01);
(Continued)

(58) Field of Classification Search
CPC .... B60G 9/003; B60G 11/113; B60G 7/001; B60G 3/145; B60G 2200/31; B60G 2202/112; B60G 2202/152
USPC ................... 280/124.116, 124.128, 124.131, 280/124.132, 124.153, 124.157
See application file for complete search history.

(56) References Cited

U.S. PATENT DOCUMENTS 3,844,579 A  * 10/1974  Cunha ................... 280/86.75
6,039,336 A     3/2000  Frey
(Continued)

FOREIGN PATENT DOCUMENTS

| CN | 1527770  | 9/2004 |
| CN | 10124964 | 8/2008 |

(Continued)

OTHER PUBLICATIONS

European Patent Office, International Search Report, Nov. 28, 2012.

*Primary Examiner* — Faye M Fleming
(74) *Attorney, Agent, or Firm* — Price Heneveld LLP

(57) ABSTRACT

The invention relates to an axle mount for utility or commercial vehicles, comprising a carrier unit and a protective unit, wherein the carrier unit has a first fastening region for the fixing of a utility vehicle axle thereto and has, arranged adjacent to said fastening region, a receiving region for receiving chassis systems, and wherein the protective unit is arranged on the carrier unit such that the receiving region is enclosed transversely with respect to an axial direction by the carrier unit and by the protective unit, in such a way that the ingress of foreign bodies into the receiving region is prevented.

13 Claims, 2 Drawing Sheets

(51) Int. Cl.
  *B60G 3/14* (2006.01)
  *B60G 11/113* (2006.01)
  *B60G 7/00* (2006.01)

(52) U.S. Cl.
  CPC ........ *B60G 11/113* (2013.01); *B60B 2900/321* (2013.01); *B60B 2900/325* (2013.01); *B60G 2200/31* (2013.01); *B60G 2202/112* (2013.01); *B60G 2202/152* (2013.01); *B60G 2204/20* (2013.01); *B60G 2204/4308* (2013.01); *B60G 2206/10* (2013.01); *B60G 2206/7101* (2013.01)

(56) References Cited

U.S. PATENT DOCUMENTS

| | | | |
|---|---|---|---|
| 6,322,089 | B1 | 11/2001 | Dantele et al. |
| 6,508,482 | B2 * | 1/2003 | Pierce et al. ........... 280/124.116 |
| 8,317,209 | B2 * | 11/2012 | Aalderink et al. ..... 280/124.116 |
| 8,454,040 | B2 * | 6/2013 | Westnedge et al. ... 280/124.116 |
| 8,490,989 | B2 * | 7/2013 | Piehl et al. .............. 280/124.11 |
| 8,622,405 | B2 * | 1/2014 | Aalderink et al. ..... 280/124.116 |
| 8,764,038 | B2 * | 7/2014 | Piehl et al. ............. 280/124.116 |
| 2009/0212523 | A1 * | 8/2009 | Koschinat ............. B60G 7/001 280/124.111 |
| 2011/0304115 | A1 * | 12/2011 | Aalderink et al. ..... 280/124.116 |

FOREIGN PATENT DOCUMENTS

| | | |
|---|---|---|
| CN | 101795877 | 8/2010 |
| DE | 29718751 | 2/1998 |
| DE | 202005004965 | 5/2005 |
| DE | 102005022745 | 10/2006 |
| DE | 102005038274 | 2/2007 |
| EP | 0830960 | 3/1998 |
| EP | 0906840 | 4/1999 |
| WO | 02074563 | 9/2002 |

* cited by examiner

Fig. 3A  Fig. 3B  Fig. 3C

AXLE MOUNT FOR UTILITY VEHICLES

BACKGROUND OF THE INVENTION

The present invention relates to an axle mount for utility vehicles or commercial vehicles according to independent claim 1.

From the state of the art, there are known axle mounts for commercial vehicles, wherein a rigid axle is connected to the vehicle frame of the commercial vehicle, preferably by means of a trailing arm and a spring mechanism. Furthermore, in the area of the rigid axle, there are arranged chassis systems such as hydraulic lines, brakes of brake cylinders, which are subject to in part considerable stresses due to foreign matter swirled up during travel or which may be severely damaged when the vehicle touches down on an obstacle. Malfunction and total failure of the commercial vehicle due to damage to important vehicle systems may often occur in particular in construction vehicles and vehicles used in rough terrain.

The object underlying the present invention is to provide an axle mount for commercial vehicles, which protects certain chassis systems during the operation of the commercial vehicle and, thus, increases the service life and the reliability of the commercial vehicle.

SUMMARY OF THE INVENTION

According to the invention, the axle mount comprises a carrier unit and a protective unit, wherein the carrier unit has a first fastening region for the fixing of a utility vehicle axle thereto and has, arranged adjacent to said fastening region, a receiving region for receiving or accommodating chassis systems, and wherein the protective unit is arranged on the carrier unit such that the receiving region is enclosed transversely with respect to an axial direction by the carrier unit and by the protective unit, in such a way that the ingress of foreign bodies or foreign matter into the receiving region is prevented or obstructed. Thus, the essential components of the axle mount for commercial vehicles are the carrier unit and the protective unit. The carrier unit, in its function, is similar to a conventional trailing arm for vehicle axles. Thus, it mainly serves to mount or support an axle, preferably the rigid vehicle axle of a commercial vehicle. The carrier unit comprises a first fastening region for accommodating the vehicle axle. Particularly preferably, said fastening region is designed as a cavity, particularly preferably a cylinder-shaped cavity, which is engaged by a commercial vehicle axle, which is in most cases designed cylinder-shaped, so as to be fixed at the carrier unit. Adjacent to the first fastening region, the carrier unit comprises a receiving region, which is in particular suitable for accommodating and supporting chassis systems, such as brake cylinders, hydraulic lines or similar peripheral systems of the chassis of a commercial vehicle. The axial direction is preferably directed parallel to the main extension direction of the commercial vehicle axle. Particularly preferably, the axial direction and the first fastening region are arranged coaxially relative to one another. In order to prevent that foreign matter, in particular dirt and swirled-up objects, enter the receiving region during the operation of the commercial vehicle, the receiving region is enclosed by the protective unit and the carrier unit transversely with respect to the axial direction. During the operation of the commercial vehicle, it has to be expected in particular that foreign matter is swirled up from the bottom, in particular from the road or the ground on which the commercial vehicle moves, towards the receiving region and enters the latter. Therefore, it is in particular preferred that the protective unit envelops the receiving region towards the bottom. Expediently, the extension along the axial direction of the protective unit is equal or larger than the extension of the carrier unit in this area. Preferably, the protective unit is fixed at the carrier unit at at least two spaced-apart fastening regions. It is thus possible to achieve, on the one hand, that the protective unit encloses and, thus, covers and protects a certain part of the receiving region or the downwards-facing side of the receiving portion. On the other hand, by means of the two fastening regions, the protective unit may fulfill a stability function, in that it additionally supports the carrier unit. Preferably, the protective unit is fixed at the carrier unit such that it may absorb forces and bending moments and, thus, increase the overall stability, in particular the area moment of inertia between the two fastening regions of the protective unit and, thus, reduces the load on the carrier unit and makes it possible to design the carrier unit with thinner walls or more lightweight. Alternatively preferably, it is also possible that the protective unit is only fixed at one fastening region at the carrier unit, and a second end of the protective unit is designed as a distal end, which preferably may project beyond the carrier unit so as to fulfill a protective function in further areas of the chassis.

In a preferred embodiment, the protective unit comprises a surface area and a support area reinforcing the surface area, wherein the support area has a greater bending stiffness transversely with respect to the axial direction than the surface area and wherein the surface area preferably has an extension along the axial direction, which is at least as large as the extension of the carrier unit in this direction. In this preferred embodiment, the protective unit preferably fulfills two essential tasks: on the one hand, it protects the receiving region against the ingress of swirled-up foreign matter, on the other hand, it also fulfills a support function, which increases the stability of the axle mount and, at the same time, for example when the vehicle axle touches down on a large, stable obstacle, provides comprehensive protection of the receiving region against the influence of large forces, which might lead to damage to the vehicle systems provided in the receiving region. Breaking up and attributing these tasks to two regions makes it possible that both the surface area and the support area are optimally adapted for their respective function, and material and weight may be saved in sum. The surface area of the protective unit preferably takes over the function of protecting or shielding the receiving region against the ingress of swirled-up foreign matter. Preferably, the surface area is formed V-shaped in cross-section at least in certain portions so that foreign matter already present in the receiving region will slide downwards along the surface area and thus be discharged from the chassis of the commercial vehicle. The support area, by contrast, preferably increases the stability of the axle mount and, in particular, is designed such that it protects the receiving region from large forces when the vehicle touches down on a large obstacle such as a stone or a curb stone edge. Preferably, the support area may be designed as a tube or other profile, wherein profiles formed as I beams, L beams or U beams are particularly preferred since they have a large area moment of inertia and, thus, a high bending stiffness although they are rather lightweight. The surface area is preferably designed as a sheet or plate, wherein it is particularly preferably provided as a steel sheet or an aluminum sheet. Further preferably, the surface area may be made from plastic, such as a thermoplastic or thermosetting material, which is lightweight, inexpensive to manufacture and particularly preferably has good absorption properties when fast-moving foreign matter enters.

In a preferred embodiment, the surface area of the protective unit is preferably arranged at the side of the support area opposite the receiving region, wherein the surface area preferably is designed as an expendable part and may be fixed at the support area by means of a releasable connection. Thus, it is preferred that the surface area of the protective unit protects not only the receiving region but also the support area against the ingress of foreign matter, wherein the support area is particularly preferably designed as an expendable part. Expendable parts are in general characterized in that they may be easily manufactured and replaced so that they allow for an inexpensive maintenance of those portions of the commercial vehicle which are subject to great loads or environmental influences. In order to easily and quickly install the surface area at the support area, it may be preferred that the surface area is fixed at the support area by means of clamps, bolts/screws, pins or the similar fasteners which are easy to manufacture and release.

Preferably, the support area is designed as a safety bar, which protects the surface area against the influence of large bodies and against ground contact. It makes sense to design the support area as a bent tube which has fastening flanges at its ends, so as to be fixed at the carrier unit by means of a bolted or welded connection. Advantageously, the installation of the axle mount is simplified in that also the surface area has fastening flanges by means of which it may be fixed at the carrier unit together with the support area. By spacing the support area apart from the surface area in the area between the fastening regions or fastening flanges it is also possible to protect the surface area from said forces when there are large forces and the support area is permanently or temporarily deformed. Preferably, a plurality of fastening regions are arranged adjacent to one another and form a kind of grid, which prevents foreign matter in excess of a certain size from entering into the receiving region.

Advantageously, the protective region at least partially or over a certain portion encloses the receiving region of a plane lying transversely with respect to the axial direction. In order to protect the receiving region of the carrier unit not only against the ingress of foreign matter moving from the bottom towards the receiving region but also against foreign matter having velocity components in the axial direction, it is preferred that the receiving region of the carrier unit is protected against the ingress of foreign matter also transversely with respect to the axial direction. Such foreign matter having a velocity component in the axial direction may be set into motion by the front wheels of the commercial vehicle or by reflection from or ricocheting off the remaining vehicle structure of the commercial vehicle. It is particularly preferred that the surface area of the protective unit extends not only two-dimensionally in the axial direction but has flanks at its respective lateral ends lying transversely with respect to the axial direction. Cavities may be present in the flanks or the sides of the surface area lying transversely with respect to the axial direction in order to guide hydraulic lines or similar cables and control devices into the receiving region. A further positive effect of this design is that in the winter, during the operation of the commercial vehicle, the chassis systems may be protected also from contact with corrosion-causing salt and, thus, their service life is considerably increased.

Particularly preferably, the carrier unit has a second fastening region for fixing the carrier unit at the vehicle frame of a commercial vehicle, and a third fastening region which may be engaged by a spring element, wherein the receiving region and the protective unit preferably are arranged between the first fastening region and the second fastening region of the carrier unit. In order to fix the axle of the commercial vehicle preferably directly via the carrier unit at the vehicle frame of the commercial vehicle, the carrier unit has a second fastening region which particularly preferably is pivotably attached to the vehicle frame of the commercial vehicle. Furthermore, the axle of the commercial vehicle should be resiliently mounted, wherein the carrier unit comprises a third fastening region to this end, which is engaged by a spring element, particularly preferably a pneumatic spring or a coil spring, and cushions the carrier unit in the case of a swiveling or pivoting movement about the second fastening region. Furthermore, particularly preferably there is provided a shock-absorbing element or a vibration-reducing element on the carrier unit, which in turn is connected to the vehicle frame of the commercial vehicle. Particularly preferably, the receiving region and the protective unit are provided between the first fastening region, i.e. between the attachment point of the vehicle axle, and the second fastening region, i.e. the attachment point of the carrier unit at the vehicle frame. This is preferred in particular since the second fastening region is fixed at the vehicle frame and there are swiveling or pivoting movements of the carrier unit about said attachment point, wherein a point on the carrier unit further away from the second fastening region experiences larger amplitudes during the swinging or oscillating movements. Preferably, hydraulic lines and possibly other peripheral systems of the vehicle, for example, should be fixed as close as is possible to the second fastening region, and experience smaller vibration or oscillation amplitudes, in particular in order to keep required flexible sections of said systems as short as is possible and in order to limit the acting centrifugal forces.

Further preferably, the protective unit is designed to at least partially absorb forces and bending moments acting between the receiving regions. Particularly preferably, the protective unit absorbs forces and bending moments which otherwise would have to be supported by the carrier unit alone, wherein the protective unit in this way increases the overall stability of the axle mount. In case the receiving region and the protective unit are arranged between the first fastening region and the second fastening region of the carrier unit, the protective unit preferably absorbs forces and bending moments acting between the first fastening region and the second fastening region.

In a preferred embodiment, the protective unit is positively and frictionally fixed at the carrier unit. Particularly preferably, the protective unit is fixed at the carrier unit by means of a bolt/screw or a plurality of bolts/screws, which create both a form fit and a frictional connection between the protective unit and the carrier unit. Further preferably, there may be provided, both on the carrier unit and on the protective unit, opposing projections and recesses, which create a form fit between the carrier unit and the protective unit, wherein said form fit is particularly preferably reinforced by a further bolt/screw connection. Alternatively preferably, the protective unit may be fixed at the carrier unit by a substance-to-substance bond, wherein there is provided in particular a welded bond. Further preferably, a connection of several welding spots together with a positive or frictional connection may be chosen.

Advantageously, the protective unit may be designed such that it covers the receiving region in a fluidically advantageous manner so as to lower the air resistance or air drag of the commercial vehicle. Particularly preferably, the protective unit at its outwards facing side, i.e. preferably the side facing downwards, has curves and fluidically advantageous contours, which allow for an even course of the fluid flow around the receiving region during the operation of the commercial vehicle. Particularly preferably, abrupt recesses or projections having sharp edges, where the fluid flow detaches and turbulence forms, is replaced by gradually increasing or decreasing or smooth courses of the cross-section at the protective unit in order to preferably allow for a quasi laminar or non-detached fluid flow around the axle mount.

Advantageously, the protective unit has cavities favoring the passage of cooling air into the receiving region in order to prevent an overheating of the chassis systems. In particular when the protective unit almost entirely encloses the receiving region in several directions, it may be desirable that the protective unit has cavities through which cooling air may pass into the receiving region to cool the chassis systems there. Particularly preferably, the cavities are provided in the direction of travel, particularly preferably laterally at the protective unit so that as little as possible air loaded with foreign matter passes into the receiving region. The cavity for air entry is preferably designed small such that larger foreign matter will not be able to pass therethrough and will not be able to endanger the chassis systems in the receiving region.

Preferably, the second fastening region of the carrier unit is designed as a cylinder-shaped cavity in order to be mountable on the vehicle frame rotatably about the central axis of the cavity. To put it differently, the second fastening region of the carrier unit is preferably designed as a bearing eye, in which a bearing bush made preferably from rubber may be inserted, which in turn may be fixed at the vehicle frame. In order to be able to pivotably fix the carrier unit at the vehicle frame, it is preferred that the second fastening region is mounted on the vehicle frame rotatably about the central axis of the cavity thereof. The swiveling or pivoting movement of the carrier unit on the vehicle frame is preferably limited and cushioned by the spring or the spring element arranged in the third fastening region.

Advantageously, the protective unit is formed from a combination of a metal with a fiber-reinforced composite material. Particularly preferably, the support area is made from metal such as steel or an aluminum alloy, and the surface area is made from a fiber-reinforced composite material. The fiber-reinforced composite material has particularly good impact and shock absorption values so as to be able to withstand bodies or matter swirled up during travel. Preferably, the surface area of the protective unit is made from a plurality of surface segments, which may be fixed at the support area. The surface segments are preferably formed as sheet strips, which are mutually exchangeable. When a section of the protective unit is damaged, it is no longer required to replace the entire protective unit but it is sufficient to replace the respective damaged surface segment. The interchangeability of the surface segments preferably simplifies the manufacture thereof since only one type of surface segments is produced which, distributed over the support area, forms the surface area of the protective unit. Preferably, the surface segments are fixed at the support area of the protective unit by means of a bolt/screw, rivet or welded connection.

Advantageously, the axle mount has a cross-sectional shape, which in the area of the protective unit at the height of the receiving region differs from the cross-sectional shape in the area of the protective unit at the height of the first fastening region. Further preferably, the cross-sectional shape of the axle mount in the area of the protective unit at the height of the receiving region differs from the cross-sectional shape in the area of the protective unit at the height of the second fastening region. By means of this cross-section of the axle mount, preferably of the carrier unit, which varies along the protective unit, it is possible to achieve an optimum transmission of force while keeping the weight of the axle mount as low as is possible. Preferably, both the wall thicknesses and the cross-sectional shapes of the carrier unit vary, wherein in particular in the case of a carrier unit made as a casting the manufacturing outlay will not considerably increase, while it is possible to transmit greater forces and, thus, to achieve an increase in service life.

Preferably, the carrier unit is preferably made from a metal and/or a fiber-reinforced composite material, and the protective unit is preferably made from a metal and/or a plastic material. Preferably, the carrier unit absorbs larger bending moments and forces than the protective unit and, therefore, it is preferably made from a bend-proof or rigid fiber-reinforced composite material such as a carbon-fiber reinforced plastic (CFK), a glass-fiber reinforced plastic (GFK) or a combination of a fiber composite and metal such as glass-fiber reinforced aluminum (GLARE). If the protective unit has to absorb only small forces and bending moments or none at all, it is preferred that it is made from a lightweight metal or a plastic material in order to save weight. Preferably, aluminum and thermoplastic or thermosetting materials may be used since said materials are not only inexpensive to manufacture but also have a low density.

It may be preferred that the geometries of the carrier unit and of the protective unit are designed such that it is possible to transmit forces and bending moments between the first fastening region and further fastening regions with as little stresses as is possible. In particular, this means that at the geometry of the carrier unit and of the protective unit, the notch effect is to be reduced, wherein there are in particular provided rounded or curved areas and transitions. Thus, as great forces and momenta as possible may be transmitted while keeping the material thickness as low as is possible, and the limits for the maximum bending stress, corrosion stress and shear stress given by the materials of the carrier unit and of the protective unit are not exceeded. Thus, there is provided a stable and at the same time lightweight axle mount.

Further advantages and features of the present invention become apparent from the following description of various preferred embodiments of the axle mount according to the invention with reference to the appended Figures. Individual features of various embodiments shown may be combined within the framework of the present invention.

DETAILED DESCRIPTION OF THE PREFERRED EMBODIMENTS

Figure 1:
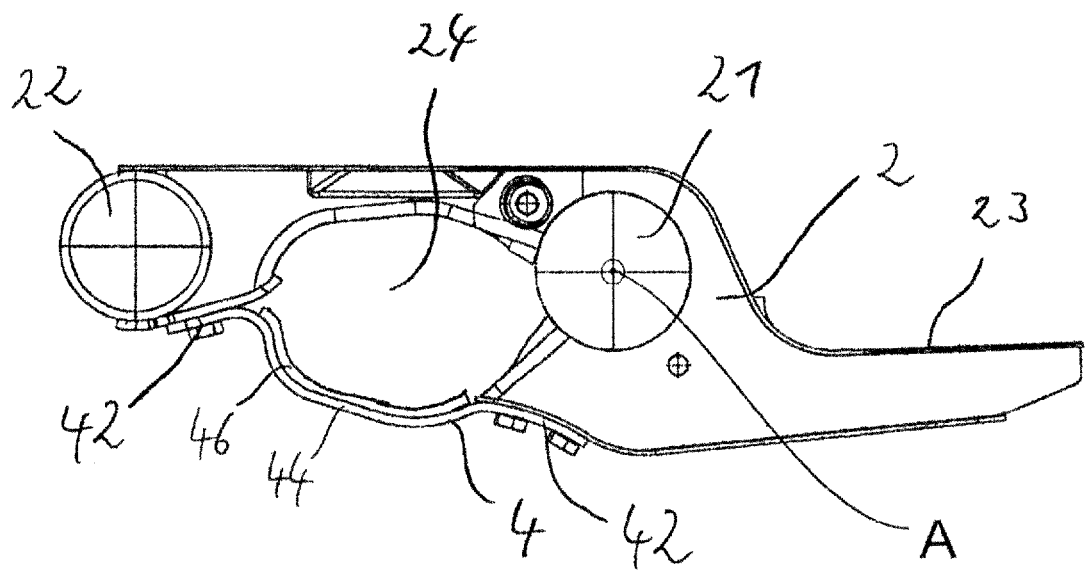
FIG. 1 a side view of a preferred embodiment of the axle mount of the invention, FIG. 2 a perspective view of a preferred embodiment of the axle mount of the invention, and FIG. 3, 3A, 3B, 3C views of a preferred embodiment of the axle mount of the invention in order to clarify various cross-sections.

The side view of FIG. 1 of a preferred embodiment of the axle mount of the invention shows a carrier unit 2 and a protective unit 4. The carrier unit 2 has a first fastening region 21, a second fastening region 22 which in the Figure is arranged to the left of the first fastening region 21, and a third fastening region 23. Between the first fastening region 21 and the second fastening region 22, there is arranged the receiving region 24, which is limited towards the top by the carrier unit 2 and towards the bottom by the protective unit 4 provided or fixed at the carrier unit. As is shown in the Figure, the receiving region 24 is preferably provided adjacent to the first fastening region 21 since it is to be expected that secondary chassis elements or systems, which are to be arranged in the receiving region 24, are to be found preferably close to the vehicle axle, which in turn is fixed in the fastening region 21 of the carrier unit 2. In the embodiment shown, the receiving region 24 is open along the axial direction, i.e. along the viewing direction, wherein alternatively it may also be preferred that the protective unit 4 closes said open sides of the receiving region 24 (not shown in the Figure). The protective unit 4 particularly preferably has a support area 44 and a surface area 46, wherein in the embodiment shown in the Figure, the support area 44 is arranged above the surface area 46, the support area 46 is connected to the carrier unit 2 in two fastening regions 42 of the protective unit 4, and wherein the protective unit includes a pair of cooling cavities 45 extending therethrough that allow passage of cooling air into the receiving region 24 as previously discussed. Particularly preferably, the fastening regions 42 of the protective unit 4 have elements, which allow for a positive or frictional connection of the protective unit 4 at the carrier unit 2. Preferably, a connection is made by means of bolts/screws. Further preferably, the first and second fastening regions 21, 22 are provided as cylinder-shaped cavities or bearing eyes in order to accommodate a vehicle axle or a bearing bush. As is shown in the Figure, the third fastening region 23 is preferably provided as an essentially planar section, against which a pneumatic spring, for example, may rest (not shown) and at which a pneumatic spring may act perpendicularly thereto in order to support the carrier unit 2 relative to the vehicle frame of the commercial vehicle. In alternative embodiments, the third support area could also be arranged between the first and second support areas. Preferably, the connection of the protective unit 4 at the carrier unit 2 is designed as a releasable connection such that the protective unit 4 is easy to dismount so that the underlying chassis systems may be reached in order to service, replace or exchange them.

Figure 2:
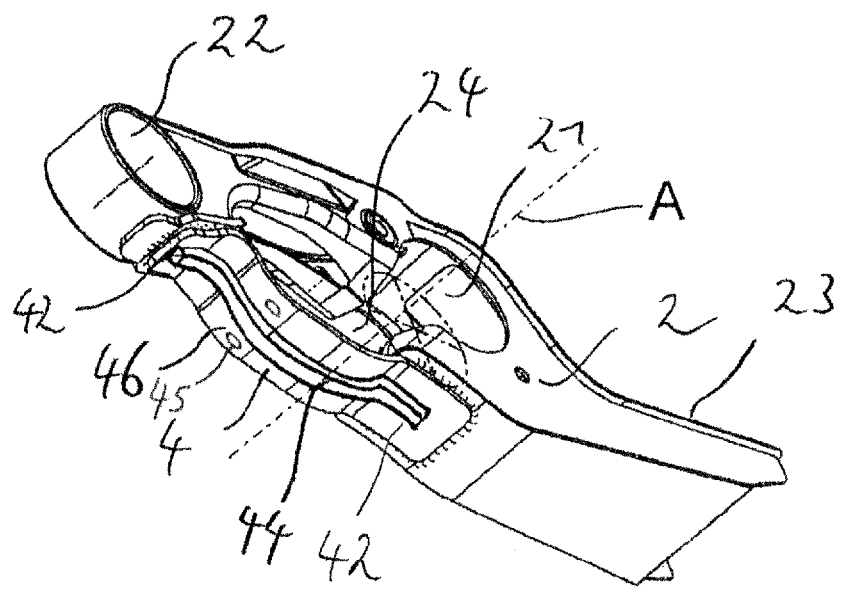

FIG. 2 shows a perspective view of a preferred embodiment of the axle mount of the invention, wherein the carrier unit 2 and the protective unit 4 are visible diagonally from the bottom. As an alternative embodiment to the embodiment shown in FIG. 1, the protective unit 4 is fixed at the carrier unit 2 by means of a substance-to-substance bond. This preferred embodiment is indicated by the welded joints shown in the Figure, which are circumferentially provided in the fastening regions 42 of the protective unit 4. As a matter of course, the protective unit 4 shown in FIG. 2 may be fixed at the carrier unit 2 also by means of a bolt/screw connection, as it is shown in FIG. 1, instead of the welded connection. Furthermore, there is shown the support area 44, which preferably is designed as a tube-shaped body and follows the course of the contour of the protective unit 4, wherein the support area 44 in this shown embodiment is arranged below the surface area 46.

Figure 3:
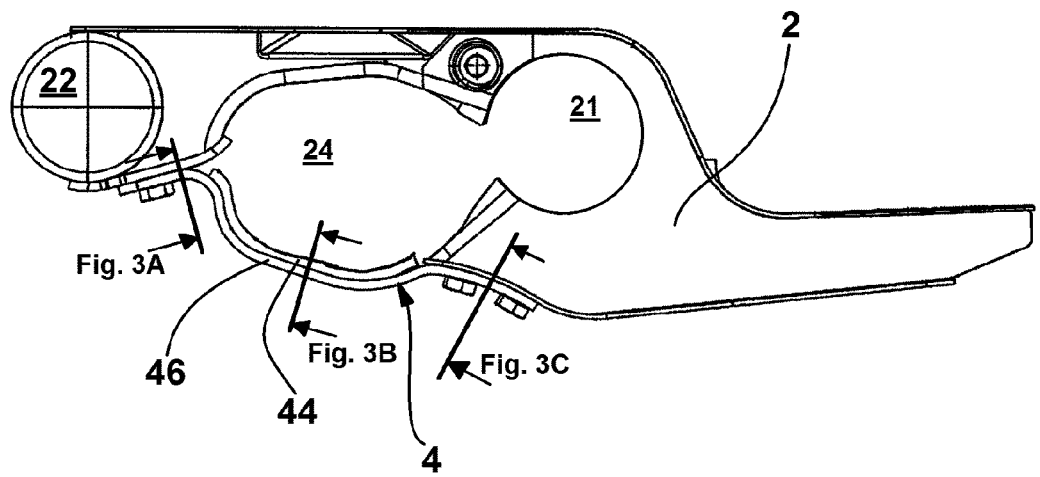
Figure 3:
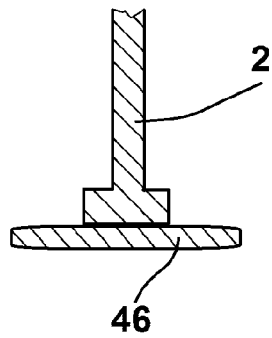
Figure 3:
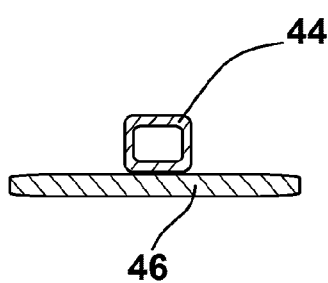
Figure 3:
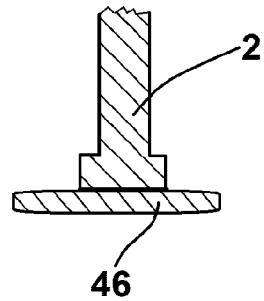

FIG. 3 shows a side view of the preferred embodiment already shown in FIG. 1, wherein the position of three sections through the axle mount in the area of the protective unit 4 is marked. FIG. 3A shows the section marked on the left in FIG. 3, which section runs through the axle mount in the area of the protective unit 4 at the height of the second fastening region 22. FIG. 3B shows the section shown in the middle of FIG. 3, which section runs through the axle mount in the area of the protective unit 4 at the height of the receiving region 24. FIG. 3C shows the section shown at the right of FIG. 3, which section runs through the axle mount in the area of the protective unit 4 at the height of the first fastening region 21. It becomes clear that along the protective unit 4 the cross-section of the axle mount varies in the area of the protective unit 4. The comparison of the cross-section shown in FIG. 3A with that in FIG. 3B shows that the carrier unit 2 at the height of the second fastening region 22 has a T-shaped cross-section, wherein at the height of the receiving region 24 there is provided no material of the carrier unit 2 but only the protective unit 4, consisting of the support area 44 and the surface area 46. Furthermore, the carrier unit 2 at the height of the first fastening region 21 has a greater material strength (cf. FIG. 3C) than at the height of the second fastening region 22, preferably in order to be able to better withstand the forces transmitted from the commercial vehicle axle to the first fastening region 21. Due to the different cross-sections and, thus, material strengths, in particular of the carrier unit 2, there is achieved an optimum adaptation to the stresses occurring, while the weight of the axle mount is kept low.

LIST OF REFERENCE SIGNS

2—carrier unit
4—protective unit
21—first fastening region
22—second fastening region
23—third fastening region
24—receiving region
42—fastening region
44—support area
46—surface area

The invention claimed is:

1. An axle mount for commercial vehicles, comprising:
a carrier unit; and
a protective unit;
wherein the carrier unit has a first fastening region in which a vehicle axle is received therein and has, arranged adjacent to and at least partially offset from said fastening region, a receiving region in which a chassis systems different than the vehicle axle is received; and
wherein the protective unit is arranged on the carrier unit such that the receiving region is enclosed transversely with respect to an axial direction by the carrier unit and by the protective unit, in such a way that the ingress of foreign bodies or foreign matter into the receiving region is prevented or obstructed; and
wherein the protective unit is positively and frictionally fixed at the carrier unit.

2. The axle mount of claim 1, wherein the protective unit is fixed at the carrier unit at at least two fastening regions, which fastening regions are spaced apart.

3. The axle mount of claim 1, wherein the protective unit at least over certain portions encloses the receiving region in a plane lying transversely with respect to the axial direction.

4. The axle mount of claim 1, wherein the carrier unit comprises a second fastening region for fixing the carrier unit at the vehicle frame of a commercial vehicle, and a third fastening region, at which a spring element may be brought into engagement, and wherein the receiving region and the protective unit are arranged between the first fastening region and the second fastening region of the carrier unit.

5. The axle mount of claim 4, wherein the protective unit is adapted to at least partially absorb forces and bending moments acting between the receiving regions.

6. The axle mount of claim 1, wherein the protective unit is designed such that it envelops the receiving region so as to lower the air resistance of the commercial vehicle.

7. The axle mount of claim 1, wherein the protective unit comprises a combination of a metal and a fiber-reinforced composite material.

8. The axle mount of claim 1, having a cross-sectional shape, which in the area of the protective unit at the height of the receiving region differs from the cross-sectional shape in the area of the protective unit at the height of the first fastening region.

9. An axle mount for commercial vehicles, comprising:
a carrier unit; and
a protective unit;
wherein the carrier unit has a first fastening region for the fixing of a vehicle axle thereto and has, arranged adjacent to said fastening region, a receiving region for receiving chassis systems different than the vehicle axle; and
wherein the protective unit is arranged on the carrier unit such that the receiving region is enclosed transversely with respect to an axial direction by the carrier unit and by the protective unit, in such a way that the ingress of foreign bodies or foreign matter into the receiving region is prevented or obstructed; and
wherein the protective unit is positively and frictionally fixed at the carrier unit;
wherein the protective unit has a surface area and a support area reinforcing the surface area, wherein the support area has a higher bending stiffness transversely with respect to the axial direction than the surface area, and wherein the surface area has an extension along the axial direction, which is at least as large as the extension of the carrier unit in the axial direction.

10. The axle mount of claim 9, wherein the surface area of the protective unit is arranged on that side of the support area opposite the receiving region, and wherein the surface area is an expendable part and is fixed at the support area by a releasable connection.

11. The axle mount of claim 9, wherein the support area comprises a safety bar, which protects the surface area against the influence of large bodies or matter and against ground contact.

12. The axle mount of claim 9, wherein the surface area of the protective unit comprises a plurality of surface segments fixed at the support area.

13. An axle mount for commercial vehicles, comprising:
a carrier unit; and
a protective unit;
wherein the carrier unit has a first fastening region for the fixing of a vehicle axle thereto and has, arranged adjacent to said fastening region, a receiving region for receiving chassis systems different than the vehicle axle; and
wherein the protective unit is arranged on the carrier unit such that the receiving region is enclosed transversely with respect to an axial direction by the carrier unit and by the protective unit, in such a way that the ingress of foreign bodies or foreign matter into the receiving region is prevented or obstructed; and
wherein the protective unit is positively and frictionally fixed at the carrier unit;
wherein the protective unit has cavities which allow the passage of cooling air into the receiving region so as to avoid overheating of the chassis systems.

* * * * *

UNITED STATES PATENT AND TRADEMARK OFFICE
CERTIFICATE OF CORRECTION

Page 1 of 2

PATENT NO. : 9,463,667 B2
APPLICATION NO. : 14/237291
DATED : October 11, 2016
INVENTOR(S) : Spielmann It is certified that error appears in the above-identified patent and that said Letters Patent is hereby corrected as shown below:

In the Specification

Column 6, Line 38:
"momenta" should be — moments —

Column 6, Line 59:
"FIG." should be — FIGS. —

Column 7, Line 22 (2nd occurrence):
"46" should be — 44 —

In the Claims

Column 8, Claim 1, Line 47:
"systems" should be — system —

Column 8, Claim 1, Line 48:
Delete "and" after — received; —

Column 9, Claim 9, Line 24:
Delete "and" after — axle; —

Column 9, Claim 9, Line 30:
Delete "and" after — obstructed; —

Column 9, Claim 9, Line 32:
After "unit;" insert -- and --

Column 10, Claim 11, Line 11:
"of large bodies or matter" should be — of large bodies of matter —

Signed and Sealed this
Tenth Day of July, 2018

Andrei Iancu
*Director of the United States Patent and Trademark Office*

CERTIFICATE OF CORRECTION (continued)
U.S. Pat. No. 9,463,667 B2

Column 10, Claim 13, Line 23:
Delete "and" after — axle; —

Column 10, Claim 13, Line 29:
Delete "and" after — obstructed; —

Column 10, Claim 13, Line 31:
After "unit;" insert -- and --